United States Patent [19]

Nenadal

[11] Patent Number: 4,593,587
[45] Date of Patent: Jun. 10, 1986

[54] MACHINE TOOL UTILIZING FORCE TRANSMITTING JOINTS

[75] Inventor: Arthur F. Nenadal, N. Olmsted, Ohio

[73] Assignee: The Warner & Swasey Company, Cleveland, Ohio

[21] Appl. No.: 749,128

[22] Filed: Jun. 27, 1985

Related U.S. Application Data

[63] Continuation of Ser. No. 282,635, Jul. 13, 1981, abandoned.

[51] Int. Cl.⁴ .............................................. B23B 17/00
[52] U.S. Cl. ............................................ 82/32; 29/460
[58] Field of Search ............... 82/32, 2 R, 36 A, 1 C; 29/149.5, 460; 156/292, 293, 294; 264/261; 408/234

[56]  References Cited

U.S. PATENT DOCUMENTS

| | | | |
|---|---|---|---|
| 1,498,769 | 6/1924 | Wood | 82/32 |
| 2,079,791 | 5/1937 | Cook | 82/1 C |
| 2,487,289 | 11/1949 | Yeomans | 269/7 |
| 2,554,102 | 5/1951 | Globash et al. | 82/32 |
| 3,124,985 | 3/1964 | Curtis | 82/2 |
| 3,307,438 | 3/1967 | Bottger et al. | 82/32 |
| 3,526,397 | 9/1970 | Verguson | 29/460 |
| 3,534,643 | 10/1970 | Markgraf | 82/32 |
| 3,586,395 | 6/1971 | Weaver | 82/32 |
| 3,650,166 | 3/1972 | Schmid | 82/32 |
| 3,750,245 | 8/1973 | Kennedy et al. | 82/36 A |
| 3,785,227 | 1/1974 | Wolff | 82/2 |
| 3,800,636 | 4/1974 | Zagar | 82/32 |
| 3,837,245 | 9/1974 | Schuler et al. | 82/32 |
| 3,852,979 | 12/1974 | Muhlhausler | 29/460 |
| 4,040,316 | 8/1977 | Granespacher et al. | 82/32 |
| 4,219,916 | 9/1980 | Kincel | 29/149.5 |
| 4,539,876 | 9/1985 | Myers et al. | 82/32 |

FOREIGN PATENT DOCUMENTS

| | | | |
|---|---|---|---|
| 1125823 | 9/1968 | United Kingdom | 82/32 |
| 560675 | 6/1977 | U.S.S.R. | 29/460 |

OTHER PUBLICATIONS

A.P.C. Application of J. Wilberz, Ser. No. 358,562, published Jun. 8, 1943.

Primary Examiner—Francis S. Husar
Assistant Examiner—Jerry Kearns
Attorney, Agent, or Firm—H. G. Massung; J. R. Benefiel; R. J. Eifler

[57]  ABSTRACT

An improved machine tool (10) utilizing force transmitting joints for securing a way block (32) to a one-piece cast bed (12). The way block (32) and one-piece bed (12) have interlocking projections (70) and recesses (72) for transmitting the load between the two joined surfaces. A hardenable, castable filler (84, 86, 88) is provided between the interlocking projections (70) and recesses (72) and between other selected portions (100, 104) of the way block (32) and cast bed (12) to provide for accurate positioning of the way block (32) with respect to the driven spindle assembly (18). Securing means such as bolts (76) or an adhesive is provided for holding the way block (32) in place. During operation, the shearing loads generated by the metal cutting process are directly transmitted from the way block (32) through filler (86) to the cast bed (12). This reduces the size and sophistication required of the securing means which holds down the way block (32). The thickness and location of the hardenable, castable material (84, 86, 88) between the way block (32) and the bed (12) is variable to accommodate variations in the spatial orientation of the way block (32) with respect to the driven spindle (18). Passages (74) which permit the introduction of filler are provided through the way block (32) into the vicinity of the various projections (70).

9 Claims, 6 Drawing Figures

MACHINE TOOL UTILIZING FORCE TRANSMITTING JOINTS

This application is a continuation of application Ser. No. 282,635, filed July 13, 1981, and now abandoned.

CROSS REFERENCE TO RELATED APPLICATION

This application is related to U.S. Pat. application Ser. No. 100,019 filed Oct. 20, 1980 whose teachings are herein incorporated by reference.

BACKGROUND OF THE INVENTION

1. Technical Field

This invention relates to a metal cutting machine tool and more particularly to a turning machine wherein the shear loads generated by metal cutting are transmitted directly from a way block to a cast bed.

2. Background Art

Machine tools having rigid metal bases upon which spindles, turrets, and/or tailstocks are mounted are well known in the art, as exemplified by the constructions shown in U.S. Pat. Nos. 3,124,985; 3,534,643; and 3,785,227. Although these machine tools may have been satisfactory in their operation, efforts have been made to reduce the cost of forming the beds or bases of these machine tools. In an effort to reduce the cost of forming the bed of a machine tool, it has been suggested that the bed be cast from concrete or similar materials as disclosed in U.S. Pat. Nos. 3,800,636; 3,837,245; and 4,040,316.

DISCLOSURE OF THE INVENTION

The present invention relates to a new and improved machine tool having a cast bed which is used in a substantially as-cast condition with little or no machining. A way block is positioned relative to the bed or base by locating the way block with suitable fixtures. The way block and the bed include interlocking recesses and projections. A body of castable, hardenable material is injected into the space between the projections and recesses and between other selected surfaces of the way block and the bed for accurately positioning the way block with respect to the bed. The machine tool includes a headstock portion with a driven spindle. The way block is positioned to be accurately aligned with respect to the driven spindle when the positioning filter material is in place. Securing means such as bolts or an adhesive or bonding agent disposed in the castable material are utilized for holding the one-piece way block in place. The projections and recesses allow the shear loads generated during cutting to be transmitted directly between the way block and the bed through the castable material rather than through the securing means. The disclosed construction facilitates building a machine tool with a minimum amount of labor and machining of parts. Also relatively large milling or grinding machines are not required.

In the disclosed machine tool raised areas or projections on one surface, which match in location and configuration cavities or recesses in a mating surface, are provided. Gaps are left between the projections and their mating recess surfaces to allow alignment of the mating parts. The castable filler is used to fill these gaps after alignment. Openings are provided extending through the way block through which castable filler can be injected into the gaps. The openings also permit the exiting of air as the filler material flows or is pumped into place. By directly transmitting the shear loads, generated by the metal cutting process, through the filler rather than through the securing means, the joint size and sophistication required for joining the one-piece way block to the cast bed is reduced.

BRIEF DESCRIPTION OF THE DRAWINGS

For a better understanding of the invention, reference may be ahd to the preferred embodiment exemplary of the invention shown in the accompanying drawings in which.

BEST MODE FOR CARRYING OUT THE INVENTION

Figure 1:
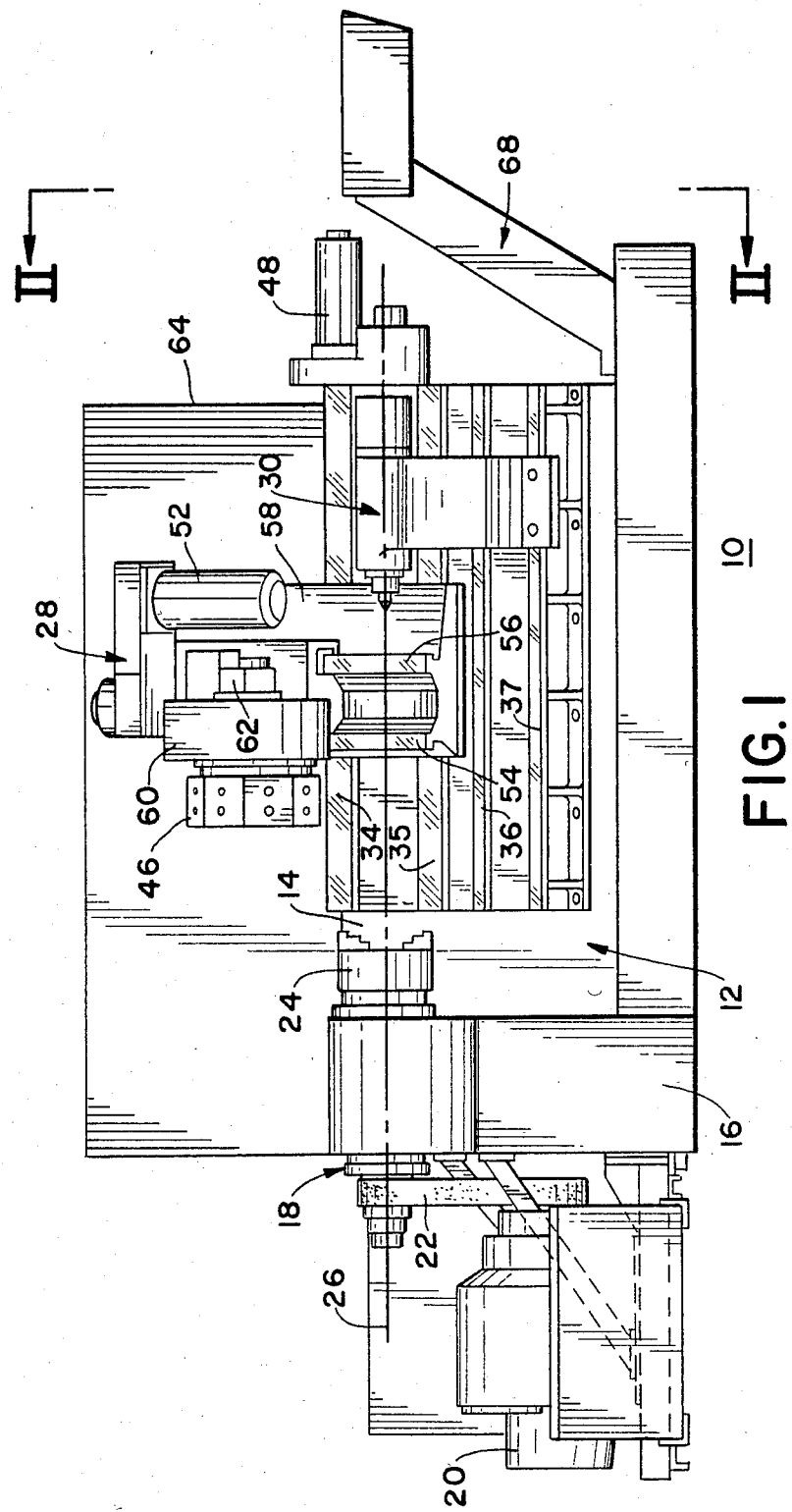
FIG. 1 is a front elevation view of a horizontal turning machine construction in accordance with the present invention.
Figure 2:
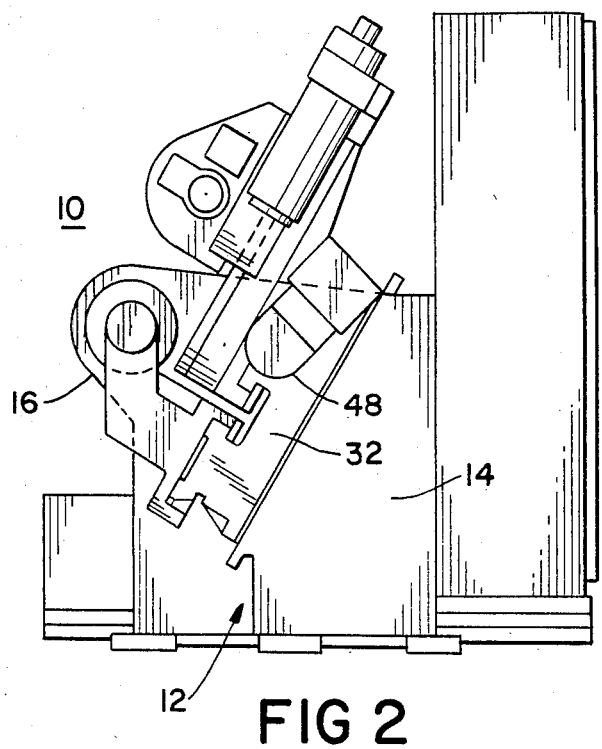
FIG. 2 is a right end view of the turning machine of FIG. 1 with portions removed for clarity.

Referring now to the drawings and FIGS. 1 and 2 in particular, there is shown a horizontal turning machine 10 constructed in accordance with the present invention. Turning machine 10 has a cast bed or base 12 with a longitudinally extending slant bed portion 14, and a headstock portion 16. If desired, bed 12 can be a weldment. A driven spindle assembly 18 is mounted in the headstock portion 16. The spindle assembly is driven by a motor 20 through a suitable belt drive 22. A work engaging member, such as chuck 24, is connected to the driven spindle assembly 18 to rotate a workpiece about a central axis 26. A tool turret assembly 28 and a tailstock assembly 30 are movably mounted on a one-piece way block 32. The way block 32 is mounted to the slant bed portion of the bed 12 in a manner to be described hereinafter in detail. Way block 32 is provided with ways 34, 35, 36, and 37. Ways 34 through 37 extend parallel to the axis 26 and guide movement of the tool turret assembly 28 and the tailstock assembly 30 relative to spindle assembly 18.

A tool turret 46 is indexably supported from turret assembly 28. A turret z-axis servo drive 48 moves the turret assembly 28 along the z-axis toware and away from the headstock portion 16 of the base 12. In addition, an x-axis servo drive motor 52 is operable to move the tool turret 46 along the x-axis toward and away from the spindle axis 26. Tool turret assembly 28 includes a carriage 58 which is positioned by z-axis servo drive 48. Ways 54 and 56 are provided on carriage 58 along which a carrier 60 is moved by the x-axis servo drive motor 52. Servo drive motors 48 and 52 may be operated simultaneously at various speeds and selected directions to provide full two-axis movement for tool turret 46. An indexing motor 62 is operable to rotate the tool turret 46 to a selected angular position about an axis extending parallel to the spindle axis 26, to position various tools mounted on tool turret 46 in a position to engage a workpiece.

Suitable electrical controls are provided in control cabinet 64 to control operation of horizontal turning machine 10. During operation of turning machine 10 the tools mounted on tool turret 46 engage and cut metal form a workpiece as the workpiece is being rotated by driven spindle assembly 18. A chip conveyor assembly 68 is provided to remove chips from the cutting area. Chip conveyor 68 has been deleted from FIG. 2 in order to more clearly illustrate the relationship between slant bed portion 14 and way block 32.

Figure 3:
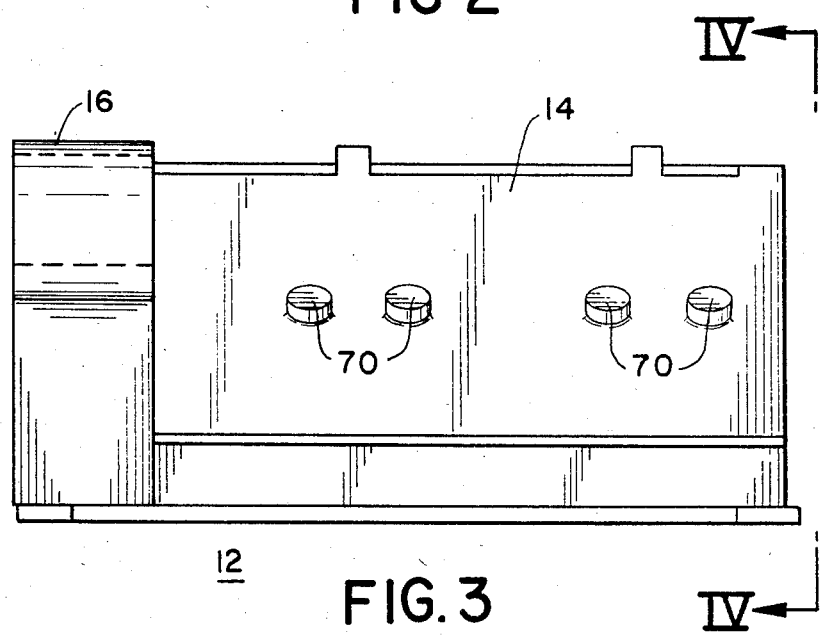
FIG. 3 is a front elevation view of the cast base used in the turning machine of FIG. 1.
Figure 5:
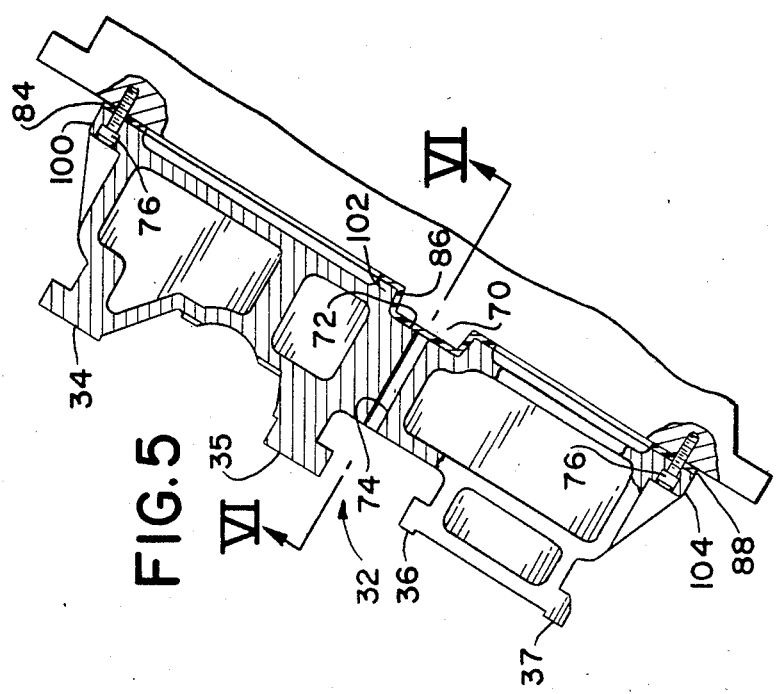
FIG. 5 is an enlarged fragmentary view illustrating the disclosed force transmitting joint between the way block and the bed; and, FIG. 6 is a section view taken in FIG. 5 along the line VI—VI.
Figure 4:
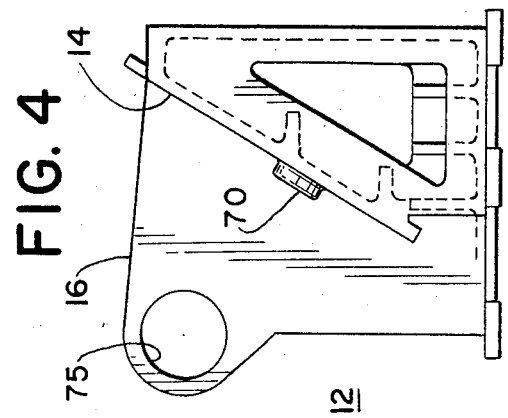
FIG. 4 is a right end view of the cast bed utilized on the turning machine of FIG. 1.
Figure 6:
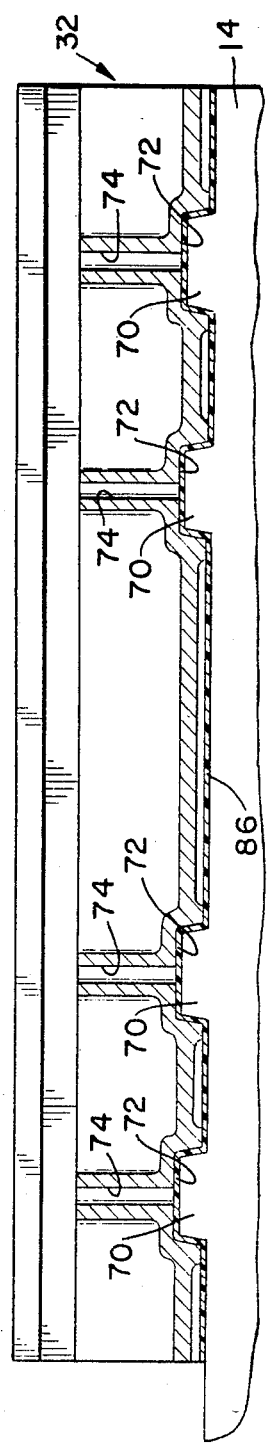

Referring now to FIGS. 3 and 4, there is shown the one-piece cast bed 12. Bed 12 includes a longitudinally extending slant bed portion 14 and a head portion 16. As bed 12 is cast a plurality of projections 70 are formed in the relatively flat slant bed portion 14. An opening 75 is formed in the headstock portion 16 for receiving spindle assembly 18. Due to casting tolerances, the longitudinal axis of the rough cast spindle opening 75 may be slightly skewed relative to the slant bed portion 14. Spindle assembly 18 is aligned in the rough opening 75 in a manner as described in detail in co-pending U.S. patent application Ser. No. 199,019.

There is a substantial tolerance range for the as-cast orientation of the way block 32 relative to the slant bed portion 14. It is necessary that the way block 32 be accurately located relative to spindle assembly 18 since tools mounted on tool turret 46 must be precisely positioned relative to a workpiece when machining. In addition, the tailstock assembly 30 must be accurately aligned with the longitudinal axis of spindle assembly 18.

When the bed 12 and way block 32 are to be interconnected the way block 32 is supported in a spaced apart relationship from the slant bed position 14 of bed 12 by a suitable jig or fixture. Once the way block 32 has been located so that the ways 34 through 37 are closely aligned with spindle axis 26 suitable dams are formed to retain a castable filler between desired locations of the slant bed portion 14 and the way block 32. The castable material is then injected between the selected portions of the way block 32 and bed 12. As the material hardens it forms a solid cast body which maintains the spatial orientation of the way block 32 relative to the bed 12.

When the way block 32 is positioned on the slant bed portion 14 projections 70 extend into openings 72 formed in the bottom of way block 32. Passages 74 which extend from the top surface of way block 32 communicate with recessed openings 72. Passages 74 can vent trapped air and/or conduct castable material into desired locations.

The hardenable filler is injected into the gaps between projections 70 and recesses 72. Suitable vents 74 are provided to enable air to escape as the hardenable filler material is conducted into the selected spaces between way block 32 and slant bed portion 14. When the way block 32 is mounted in place a body of hardenable material 86 is provided around the recesses, and strips 84, 88 of hardenable material are provided along each edge of way block 32. The strips 84, 88 of hardenable material which are formed between edge sections 100, 104 of way block 32 and slant bed portion 14, and the body of hardenable material 86 which is formed around projections 70 between a center section 102 of way block 32 and slant bed portion 14 permanently and accurately position way block 32 in the desired orientation with respect to spindle axis 26. The hardenable filler 84, 86, 88 is shaped by the way block 32 and bed 12 to compensate for any irregularities in the as-cast surfaces. It is, therefore, not necessary to machine the bed 12 before mounting the way block 32 thereto. This eliminates expensive maching operations on bed 12.

The disclosed force transmitting joint consists of projections 70 on one surface which match, in location and configuration, cavities or recesses 72 in a mating surface. When the way block 32 is positioned, gaps are left between the cavities 72 and their mating projections 70 as way block 32 is aligned with the spindle axis 26. When the hardenable filler is in place, it fills the gaps left after alignment of the way block 32 and permanently positions the way block 32 with respect to the spindle assembly 18.

A plurality of bolts 76 are provided along the edges of the way block 32 extending through the way block and hardenable filler into the bed 12. These bolts 76 hold the way block in contact with filler 84, 86, 88 which provides the desired positioning. However, cutting shear loads generated by metal cutting are directly transmitted through the body filler 86 into the bed 12 and not through the joining means 76. Rather than bolts, an adhesive or bonding agent can be provided in the filler for holding the way block in place. Transmitting the shear loads generated by the metal cutting process into the projections 70 which are formed integral with bed 12 reduces the required joint size and simplifies construction of the disclosed turning machine 10.

The thickness of the castable, hardenable filler material will vary as a function of the variations in the spacial orientation of the way block 34 with respect to the spindle axis 26, and as a function of variations in the dimensions of way block 32 and bed 12. The body of the cast filler should have a minimum thickness which enables it to compensate for the tolerance ranges between the as-cast surfaces on the way block 32 and the bed 12. This minimum thickness is sufficient to maintain the way block 32 spaced apart from the slant bed portion 14 of bed 12 and to enable filler material to at least partially absorb vibrations transmitted to the way block 32 during a machining operation.

A parting compound can be provided between either the way block 32 and the hardenable filler 84, 86, 88 or between the hardenable filler 84, 86, 88 and the bed 12 to enable the way block 32 to be easily disassembled from the slant bed portion 14. The body of hardenable material 84, 86, 88 between the bed 12 and way plate 34 performs the primary function of permanently positioning way block 32 relative to bed 12 and the associated spindle axis 26. Even if a parting compound is used, the hardenable material 84, 86, 88 is shaped by the associated surfaces of bed 12 and way block 32 to compensate for surface irregularities. It is apparent with the present invention, a turning machine 10 has a cast bed 12 which is used in a substantially as-cast condition, requiring little or no machining on the bed 12 or the way block 32. The as-cast bed 12 has a relatively large dimensional tolerance range, therefore way block 32 is positioned relative to the bed 12 by locating the way block with suitable fixtures. The hardenable filler when cast between the way block 32 and the bed 12 provides for permanent accurate positioning of the way block 32. The projections 70 which mate with the recesses 72 in way block 32 act to directly transmit shear forces into bed 12 and simplify machine construction.

I claim:

1. A force transmitting joint in combination with a turning machine (10) of the type having a base (12) that includes a bed portion (14), a headstock (16) mounted to said base (12) and supporting a driven rotatable spindle (18), a way block (32) having a pair of elongated ways (34, 35), means for mounting the way block (32) having a pair of elongated ways (34, 35), with said ways extending along a longitudinal axis of said bed portion (14), means for mounting the way block (32) to the bed portion (14) of the base (12), a support assembly (28) mounted for movement on said pair of elongated ways (34, 35), and a tool turret (46) mounted on the tool turret assembly (28), the improvement wherein the means for mounting the way block (32) to the bed portion (14) of the base (12) is characterized by a force transmitting joint comprising:
- a plurality of spaced apart recesses (72) formed in either one of the bed portion (12) or the way block (32) each of said recesses formed with a peripheral surface;
- a plurality of integral projections (70) spaced apart corresponding to said spacing of said recesses, extending from the other of the bed portion (12) or the way block (32), at least a portion of each of said projections extending into and in spaced relationship to a respective recess to form a clearance space with said peripheral surface of each of said recesses extending completely about a respection projection; and castable grout (86) disposed around said projections, in said clearance space between said projections (70) and said recesses (72) and between adjacent recesses so that the grout (86) forms a continuous layer between the way block (32) and the bed portion (14) of the base (12) whereby said way block may be adjustably positioned on said bed portion prior to emplacement of said grout in said clearance space and said castable grout resists shearing forces in any direction generatd by machining by being compressed in said space between each of said projections and said peripheral surface of each of said recesses.

2. The turning machine (10) as described in claim 1 wherein:
said integral projections (70) and recesses (72) are aligned along said longitudinal axis of the bed portion (14).

3. The turning machine as described in claim 2 comprising:
at least one passage (74) extending through said way block (32) to permit castable grout to be injected in said clearance spaces between said projections (70) and said recesses (72).

4. The turning machine (10) as described in claim 2 wherein said way block (32) is formed with edges extending parallel to said longitudinal axis, and
a strip of castable grout (84, 88) extends along each longitudinal edge of the way block (32), between the way block (32) and the bed portion (14); and wherein said means for mounting further includes:
a plurality of fasteners (76) extending through the way block (32) and into the bed portion (14).

5. The turning machine as described in claim 2 wherein said way block (32) is formed with edges extending parallel to said longitudinal axis, and
a strip of castable grout (84, 88), is disposed between each longitudinal edge of the way block (32) and the bed portion (14).

6. A horizontal turning machine comprising:
a one-piece base having a slant bed portion and an integral headstock;
a driven spindle assembly connected to said headstock;
a plurality of projections extending out from said slant bed portion;
a way block, having a first pair or ways formed on the top thereof and a plurality of recesses formed in the bottom thereof each of said recesses have an encircling peripheral surface, said way block located on the slant bed portion with each of said plurality of projections configured to extend into and be surrounded by said peripheral surfaces of a respective recess with a clearance space therebetween;
means for locating said way block in a predetermined relationship to said slant bed portion of said base; and
a castable, hardenable filler located between said way block and said slant bed portion, in said plurality of recesses, around said projections, and between adjacent recesses.

7. A turning machine as described in claim 6 wherein said locating means comprises a plurality of bolts extending through said way block and into the slant bed portion.

8. A horizontal turning machine as described in claim 6 wherein said plurality of projections are longitudinally aligned along said slant bed portion.

9. A method of constructing a turning machine comprising the steps of:
forming a one-piece bed member a bed portion;
forming said bed member with a headstock portion for supporting a driven spindle;
forming a way block with ways extending along a longitudinal axis thereof;
forming a plurality of spaced apart projections and recesses on said bed portion and way block located and configured to be interfit together with a clearance space therebetween extending completely about a peripheral surface of each of said projections and recesses;
positioning said way block, in spaced relationship to said bed portion with said projections inserted in said recesses in spaced relationship;
positioning a spindle assembly in the headstock portion;
aligning the way block ways and spindle assembly;
injecting a hardenable filler between the way block and bed portion of the bed to fill the spaces between said recesses and said projections and interconnect adjacent recesses.

* * * * *